(12) United States Patent
Olsen et al.

(10) Patent No.: US 7,675,926 B2
(45) Date of Patent: Mar. 9, 2010

(54) HIERARCHICAL QOS BEHAVIORAL MODEL

(75) Inventors: Robert Olsen, Dublin, CA (US);
Michael Laor, Zichron-Yakov, IL (US);
Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 1017 days.

(21) Appl. No.: 10/840,126

(22) Filed: May 5, 2004

(65) Prior Publication Data

US 2005/0249220 A1  Nov. 10, 2005

(51) Int. Cl.
*H04L 12/56* (2006.01)

(52) U.S. Cl. ........................... 370/412; 370/428

(58) Field of Classification Search ............... 370/412, 370/395.4, 395.43, 468, 428, 392, 395.21; 709/232
See application file for complete search history.

(56) References Cited

U.S. PATENT DOCUMENTS

| | | | |
|---|---|---|---|
| 5,864,540 A | 1/1999 | Bonomi et al. | |
| 6,130,878 A | 10/2000 | Charny | |
| 6,147,996 A * | 11/2000 | Laor et al. | 370/394 |
| 6,408,005 B1 | 6/2002 | Fan et al. | |
| 6,424,649 B1 * | 7/2002 | Laor et al. | 370/359 |
| 6,721,796 B1 * | 4/2004 | Wong | 709/232 |
| 6,778,546 B1 * | 8/2004 | Epps et al. | 370/413 |
| 6,813,243 B1 * | 11/2004 | Epps et al. | 370/235 |
| 6,831,923 B1 * | 12/2004 | Laor et al. | 370/412 |
| 6,888,830 B1 * | 5/2005 | Snyder, II et al. | 370/392 |
| 6,940,864 B2 * | 9/2005 | Abdelilah et al. | 370/412 |
| 6,977,930 B1 * | 12/2005 | Epps et al. | 370/392 |
| 6,980,552 B1 * | 12/2005 | Belz et al. | 370/392 |
| 7,020,143 B2 * | 3/2006 | Zdan | 370/395.21 |
| 7,231,425 B1 * | 6/2007 | Charny et al. | 709/205 |
| 7,280,542 B2 * | 10/2007 | Hassan-Ali et al. | 370/395.1 |
| 7,286,525 B1 * | 10/2007 | Laor et al. | 370/359 |
| 7,304,999 B2 * | 12/2007 | Sukonik et al. | 370/396 |
| 7,321,940 B1 * | 1/2008 | Smith et al. | 709/240 |
| 7,385,987 B1 * | 6/2008 | Charny et al. | 370/395.4 |
| 7,417,999 B1 * | 8/2008 | Charny et al. | 370/408 |

(Continued)

FOREIGN PATENT DOCUMENTS

WO  WO 99/17575  4/1999

(Continued)

OTHER PUBLICATIONS

Hierarchical packet fair queueing algorithms; Bennett, J.C.R.; Hui Zhang; Networking, IEEE/ACM Transactions on vol. 5, Issue 5, Oct. 1997 pp. 675-689.*

(Continued)

*Primary Examiner*—Salman Ahmed
(74) *Attorney, Agent, or Firm*—Cindy Kaplan

(57) ABSTRACT

A hierarchical traffic management system and method (i.e., a QoS behavioral model) are disclosed herein. The system includes a classifier operable to identify and classify incoming traffic streams and a queuing system. The queuing system includes a plurality of queues and is operable to apply scheduling policies to the traffic streams. The queues of the queuing system each include enqueue attributes configured to control a depth of the queue and dequeue attributes configured to control scheduling of the queue. The dequeue attributes include minimum bandwidth, maximum bandwidth, excess bandwidth, and priority, wherein each of the queues has one or more of the dequeue attributes defined.

27 Claims, 6 Drawing Sheets

U.S. PATENT DOCUMENTS

| | | | |
|---|---|---|---|
| 7,522,609 B2 * | 4/2009 | Cohen et al. | 370/395.42 |
| 7,554,907 B1 * | 6/2009 | Epps et al. | 370/230 |
| 7,567,572 B1 * | 7/2009 | Charny et al. | 370/395.4 |
| 2002/0023168 A1 | 2/2002 | Mitchell | |
| 2002/0073226 A1 | 6/2002 | Sridhar et al. | |
| 2002/0191622 A1 | 12/2002 | Zdan | |
| 2004/0156367 A1 * | 8/2004 | Albuquerque et al. | 370/395.4 |
| 2005/0036495 A1 * | 2/2005 | Wishneusky et al. | 370/395.4 |
| 2005/0047415 A1 * | 3/2005 | Channegowda et al. | 370/395.4 |
| 2005/0091642 A1 * | 4/2005 | Miller | 717/124 |
| 2005/0094643 A1 * | 5/2005 | Wang et al. | 370/395.4 |
| 2005/0220115 A1 * | 10/2005 | Romano et al. | 370/395.4 |
| 2007/0050495 A1 * | 3/2007 | Sridhar et al. | 709/223 |

FOREIGN PATENT DOCUMENTS

WO     WO2005/112347 A2 *    11/2005

OTHER PUBLICATIONS

Performance analysis of hierarchical task queue organization for parallel systems; Cheng, S.P.; Dandamudi, S.; Distributed Computing Systems, 1992., Proceedings of the 12$^{th}$ International Conference on Jun. 9-12, 1992 pp. 286-293.*

Hierarchical fair queuing: single-step approximation of hierarchical-GPS; Jun, A.D.-S.; Jinwoo Choe; Leon-Garcia, A.; Global Telecommunications Conference, 2002. Globecom '02. IEEE vol. 3, Nov. 17-21, 2002, pp. 2405-2409 vol. 3.*

Fair queuing with service envelopes (FQSE): a cousin-fair hierarchical scheduler for Ethernet PONs; Kramer, G.; Banerjee, A.; Singhal, N.K.; Mukherjee, B.; Dixit, S.; Ye, Y.; Optical Fiber Communication Conference, 2004. OFC 2004; vol. 1, Feb. 23-27, 2004.*

Floyd S. et al:"Link-Sharing and Resource Management Models for Packet Networks" IEEE/ACM Transactions on Networking, IEEE/ACM, New York, NY, US, vol. 3, No. 4, Aug. 1, 1995.

* cited by examiner

HIERARCHICAL QOS BEHAVIORAL MODEL

BACKGROUND OF THE INVENTION

The present invention relates generally to communication networks, and more specifically, to a hierarchical QoS behavioral model that includes as a component a hierarchical packet scheduling behavioral model.

High speed networks are designed to carry services with a wide range of traffic characteristics and quality-of-service (QoS) requirements. Traffic management mechanisms provide a variety of QoS behaviors (e.g., policing, marking, low latency service, bandwidth allocation services) in routers and switches. A common task for the packet scheduling component of the QoS behavioral model is ensuring that each of multiple queues is guaranteed a minimum rate, excess bandwidth is shared in accordance with predefined weights, each queue does not exceed a specified maximum rate, and the link is maximally utilized within the maximum rate constraints.

Many different QoS behavioral models have been defined, and this can be confusing to users that want, or require, a consistent model across the entire network. In some cases, individual platforms or implementations have a different means to enable basic QoS functionality or have unique internal system bottlenecks (e.g., a switch fabric, an encryption engine) whose resources must be managed directly (via platform specific CLI (Command Line Interface)) in order for the user to achieve basic QoS goals (e.g., provide low latency to voice traffic). In such an environment, users must acquire knowledge and expertise of platform specific architectural issues and essentially learn multiple ways to achieve what is really the same goal (i.e., define the QoS behavior on a product). Users want a common and consistent interface, and the historical lack of such commonality and consistency is a serious problem for many deployments involving multiple platforms. A uniform interface is a key component to successfully providing customers with an end-to-end QoS solution.

There is therefore, a need for a highly functional QoS behavioral model that can be used on various components and platforms.

SUMMARY OF THE INVENTION

A hierarchical traffic management system and method (i.e., a QoS behavioral model) are disclosed herein. The basic building block of the model is the traffic management node (TMN). The TMN includes a classifier operable to identify and classify incoming traffic streams, a pre-queueing operator, a hierarchical queuing system, and a post-queueing operator. The queuing system includes a plurality of queues and is operable to apply scheduling policies to the traffic streams. The queues of the queuing system each include enqueue attributes configured to control a depth of the queue and dequeue attributes configured to control scheduling of the queue. The dequeue attributes include minimum bandwidth, maximum bandwidth, excess bandwidth, and priority, wherein each of the queues has one or more of the dequeue attributes defined.

The traffic management nodes operate according to a specified behavioral model and a plurality of components within a network system comprise one or more of the traffic management nodes. A common configuration language is provided for user interface with the behavioral model.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. Some of the elements in a network that employs the present invention may be network devices such as routers and switches. A traffic management system according to a behavioral model of the present system is located in one or more of the network elements. The system may be used, for example, in a router or switch platform that performs non-trivial (i.e., non-first in first out) queuing and packet scheduling. This includes, for example, applications on service provider edge and broadband aggregation.

A QoS behavioral model that supports a general classifier, pre-queueing operator (e.g., policing, marking), hierarchical queueing/scheduling system, and post-queueing operator (e.g., compression) is disclosed herein. The hierarchical scheduler supports an n-level priority service along with parameters for scheduling (e.g., minimum bandwidth, maximum bandwidth, and excess bandwidth). The scheduler is also configured to handle priority propagation, minimum rate propagation, and oversubscription. These scheduler behaviors, described further below, are combined in an integrate manner to create a behavioral model for a hierarchical scheduler that is a component of the broader QoS behavioral model.

As previously discussed, the motivation for defining a QoS behavioral model is to ensure that any platform that implements QoS will do so in a way that will result in a behavior that is consistent with the behavior provided by other platforms. That is, all platforms should conform to the QoS behavioral model and preferably present a common user interface irrespective of the implementation details of the platforms.

Figure 1:
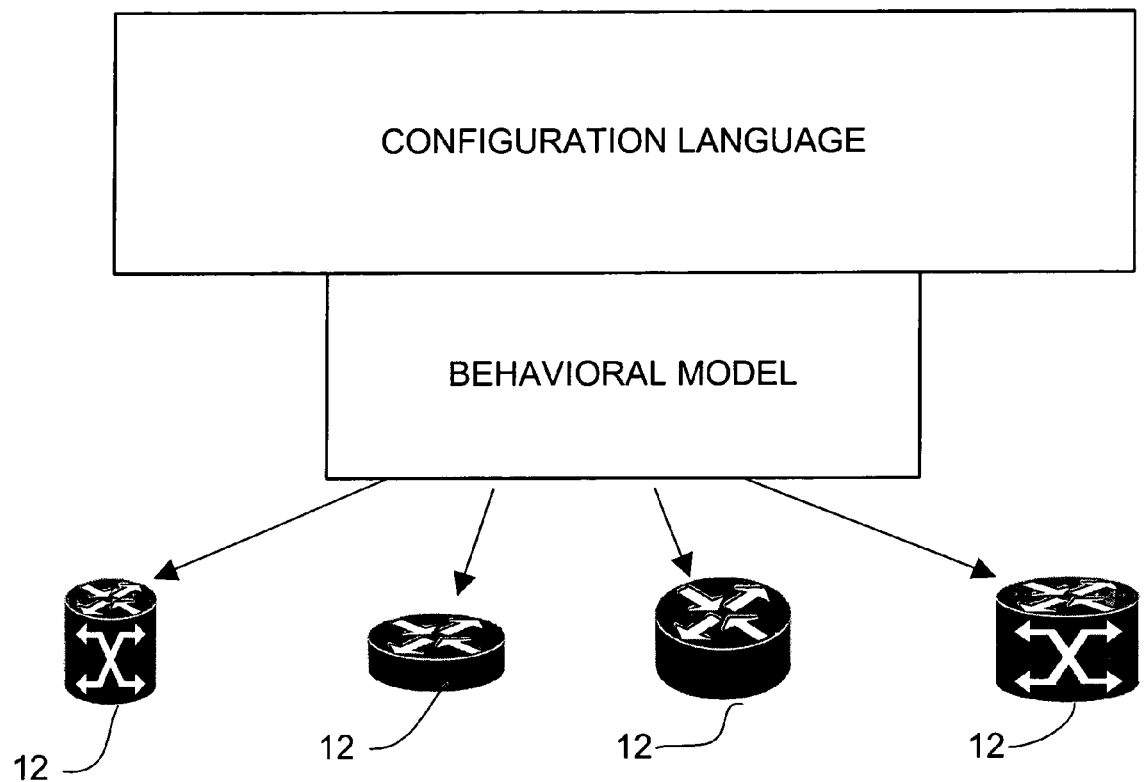
FIG. 1 depicts a QoS behavioral model of the present invention.

FIG. 1 illustrates the relationship among a configuration language for user interface (referred to herein as MQC (Modular QoS CLI)), the behavioral model and various system components (e.g., routers and switches) 12. MQC is one example of a configuration language for the abstract behavioral model and is used to enable QoS functionality by providing a platform independent interface for configuring QoS. In order to attain platform independence, the commands within the MQC define QoS functionality and behavior independent of implementation or algorithm (i.e., platform or implementation specific details are not exposed in the CLI). Examples of abstract behaviors configurable via the configuration language include guaranteeing a minimum bandwidth allocation to a class of traffic, imposing a maximum transmission rate on a class of traffic, and guaranteeing low latency to a class of traffic. Each of these examples illustrates a general behavior that is useful across platforms, and thus a common, consistent, and platform independent interface is preferably used to enable the same behavior on all platforms. It is to be understood that the configuration language referred to herein is only one example and different configuration languages may be used. Therefore, details of MQC are not provided herein.

Figure 2:
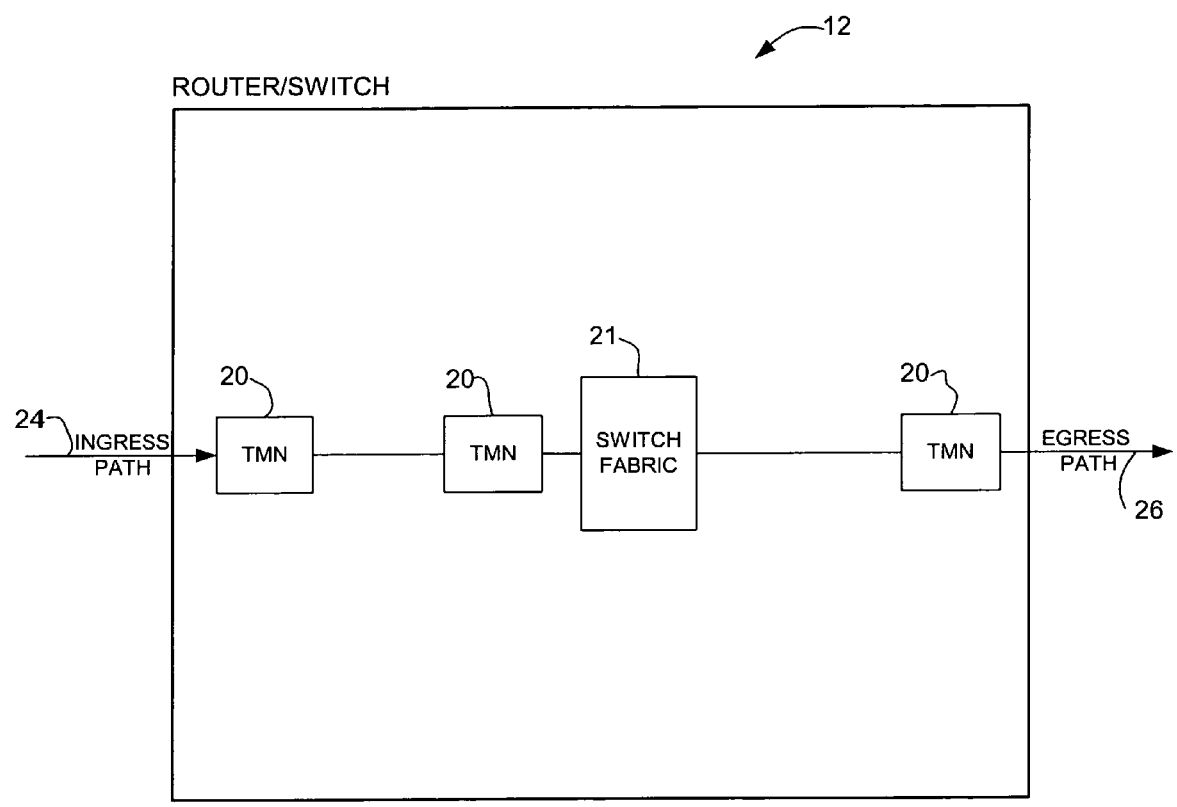
FIG. 2 is a block diagram illustrating traffic management nodes of the behavioral model located in a router or switch.

The basic building block of the behavioral model is a Traffic Management Node (TMN). A TMN can identify different traffic streams and apply policies or actions to those streams as defined by the configuration language. The TMN exists at any point along a platform data path where there is a need to manage traffic. Thus, a router may have multiple TMN structures in its datapath. The TMN may or may not be at a point where congestion may occur. FIG. 2 illustrates traffic management nodes 20 installed within a router or switch 12 at the ingress and egress ports 24, 26, and prior to the switch fabric 21 (e.g., bus). In a distributed architecture, for example, there is preferably a TMN 20 at the ingress path 24 that manages the incoming traffic stream from the interface. Such an ingress TMN may involve only classifying and policing the traffic streams, or it may involve shaping the stream to create an artificial congestion point that has an associated queuing system. The incoming stream may then congest with traffic from other interfaces or other line cards as they all attempt to traverse the router interconnect on their way to the egress interfaces, so a second TMN 20 may exist at the interconnect point 21. A third TMN structure 20 may exist on the egress path 26 providing management to traffic prior to exiting the interface.

While the TMN 20 may apply policies by placing packets into queues, the configuration of its behavior is not specified in terms of queues, but rather by defining traffic streams and the actions or policies that should be applied to those streams. Queues may be inferred by the underlying implementation if required to apply a policy that was defined by the user. Similarly, when the user defines various other actions on a class (e.g., policing), it is the underlying platform that translates this action and programs a specific operator. This creates an abstraction in which traffic streams and policies or actions are defined irrespective of the specific implementation.

Figure 3:
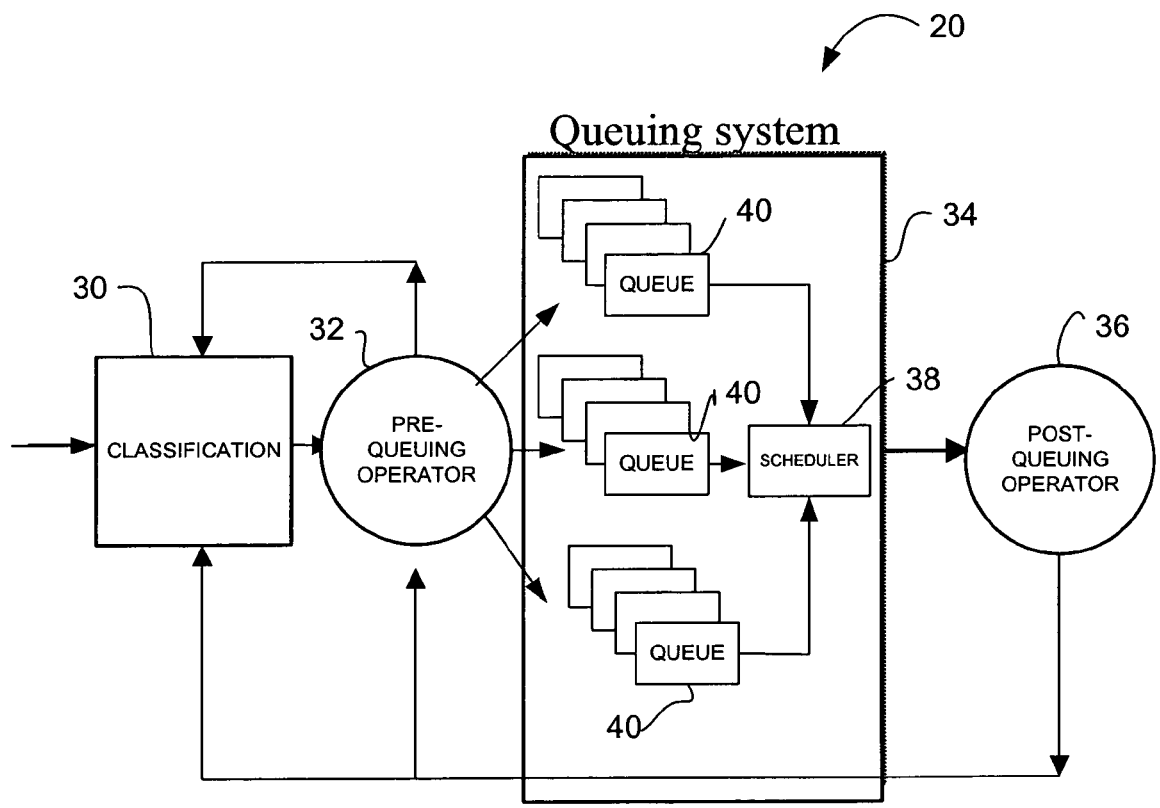
FIG. 3 is a block diagram illustrating components of one embodiment of the traffic management node of FIG. 2.

FIG. 3 illustrates details of the behavioral model at a traffic management node 20. The traffic management node structure has four components: classification phase 30, pre-queuing operator 32, queuing system 34, and post-queuing operator 36. It is not necessary for each component to be included at every traffic management node 20. For example, the pre-queuing operator 32 and post-queuing operator 36 may be optional. As shown in FIG. 3, the pre-queuing and post-queuing operators 32, 36 are allowed to send some or all of the packets back to previous stages. The following provides details of the TMN components.

The classification phase 30 is the first component that the packet stream enters. The classification function identifies packet streams that require traffic management and classifies packets. Classification can be done based on any logical combination of any fields in the packet header. Additionally, classification can be done based on the ingress or egress physical or virtual interface, as well as based on routing related information that is stored in the FIB (Forwarding Information Base) (e.g., BGP (Border Gateway Protocol) community, AS (Autonomous Systems) number), or various non-data related criteria (e.g., time-of-day). Further, classification can be based on any form of stateful classification or inspection, such as regular-expression searches, or identification of stateful protocols that have behaviors such as port hopping (i.e., protocol first negotiates connection setup on one port, and then moves to a different port for data transmission).

The pre-queuing operator 32 may then be invoked to operate on some or all of the packet streams prior to queuing. For example, pre-queueing operators 32 include a policing function (e.g., measure and enforce a packet stream rate) and a packet marking function (e.g., change IP DSCP (differentiated services code point) field). As previously noted, the pre-queuing operator 32 is optional and thus need not apply to all traffic streams. The pre-queuing operator 32 applies to traffic as it traverses the datapath, and does not provide any buffering. Policing may be applied, for example, on high priority traffic and not required for best effort traffic. Since the optional pre-queuing operation is applied prior to queuing, it may effect operation in the subsequent queuing system. In policing, for example, the policer may drop packets, thus impacting queue depths in the queuing system. Similarly, a pre-queuing coloring operation may affect a WRED (Weighted Random Early Detection) profile that is applied to a packet if WRED is enabled in the queuing system. Pre-queuing operations may include hierarchical operations. Hierarchical policing allows for policing an aggregate stream on an interface, as well as policing a specific subset of traffic.

The queuing system 34 controls several behavioral aspects, including for example, minimum bandwidth allocation, maximum bandwidth enforcement, and excess bandwidth allocation. The complete behavior of individual queues 40 is defined by the full set of attributes that control how traffic enters and exits the queue and is described in detail further below.

The post-queuing operator 36 may be invoked to operate on some of the packet streams after dequeue has occurred. The optional post-queuing operator 36 is the final stage before packets exit the TMN 20. The post-queuing operator 36 is necessary for instances when the operator must be applied to packets in the order in which they exit the TMN. For example, it may be required to compress traffic that is sent downstream through an interface. This operation may require attaching a sequence number to each packet so that the decompression agent downstream can determine the order in which packets were compressed. Therefore, the compression and attaching of the sequence number can only be done after packets are dequeued, since the order of dequeue is not known prior to performing the queuing function. The post-queuing operator 36 provides a path which allows for sending a packet back through the TMN 20 either to the optional pre-queuing operator or to the classifier and back through the queuing system (FIG. 3).

Figure 4:
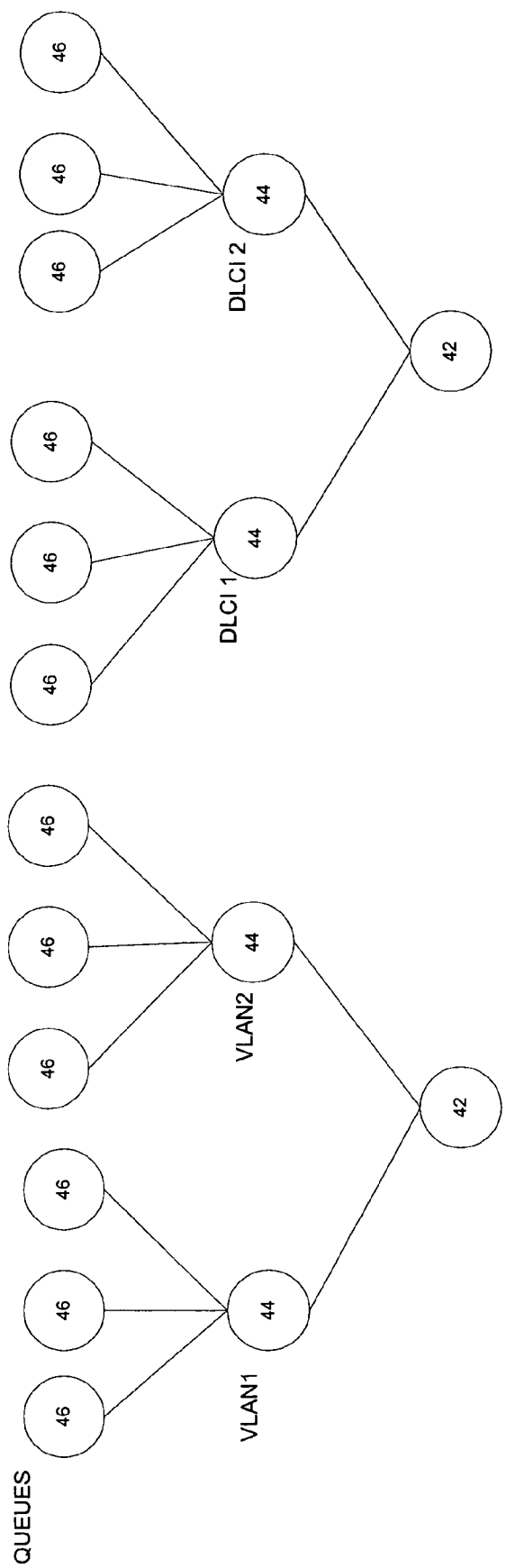
FIG. 4 illustrates a three layer hierarchy which can be supported by the behavioral model of FIG. 1.

As illustrated in FIG. 4, it is useful to define a hierarchy of traffic classes over which QoS requirements may be configured. The behavioral model may include an arbitrary number of layers of hierarchy. A model may include, for example, three levels of hierarchy as shown in FIG. 4. The bottom level or root is a node 42 defining a single physical interface over which traffic will be transmitted. The next level of hierarchy includes logical interfaces 44 which may correspond to, for example, virtual LANs (VLANs). The example shown in FIG. 4 includes VLAN 1, VLAN 2, DLCI (Data Link Connection Identifier) 1 and DLCI 2 at this second level. A third level of hierarchy consists of classes 46. Thus, all of the classes, logical interfaces, and physical interfaces are represented by nodes in a tree structure.

Each layer of the hierarchy may be configured to support: m levels of strict priority service; a set of nodes each with an attribute defining a guaranteed minimum service rate; a set of nodes each with an attribute defining given excess service (i.e., when all priority service and minimum rate service is given, then excess service is delivered); and an optional maximum rate attribute for each priority or non-priority node. A node may be given a minimum rate service as well as excess and maximum rate service. Default attributes, discussed below, apply when no attributes are defined for a given queue. It should also be noted that in the preferred embodiment, within a given branch of a tree, only one queue (node) can have the priority attribute.

Figure 5:
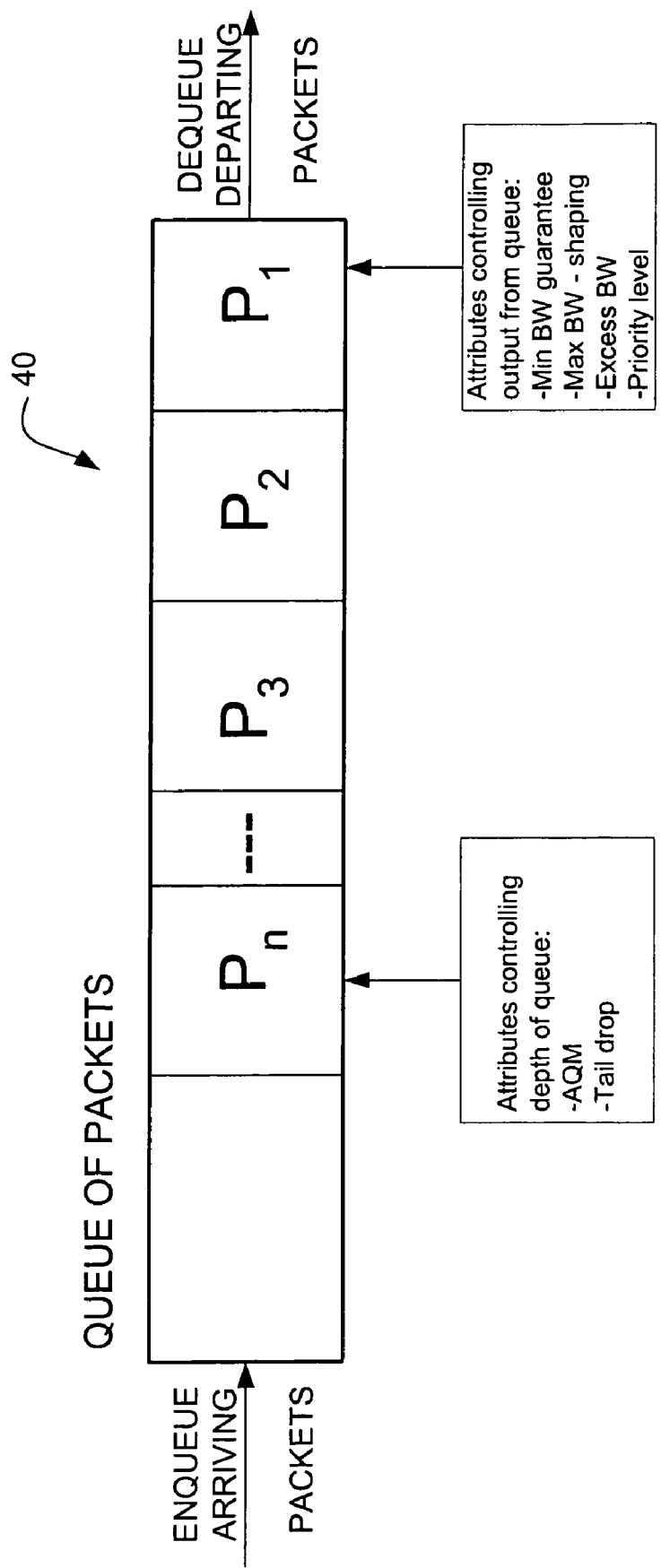
FIG. 5 depicts an example of attributes of a queue of the traffic management node of FIG. 3.

As illustrated in FIG. 5, a queue (or node) 40 in the behavioral model has two sets of attributes, enqueue and dequeue. Enqueue attributes control how packets enter a queue, and as such control the depth of the queue. Enqueue attributes include controlling the depth of a queue via specification of a maximum queue depth, resulting in tail-drop when this limit is reached, or via specification of the parameters for the active queue management (AQM) mechanism (e.g., RED or WRED).

Dequeue attributes control how packets exit the queue, and as such control the scheduling of the queue with respect to other queues. Dequeue attributes include minimum bandwidth guarantee, maximum bandwidth guarantee, excess bandwidth, and priority. Minimum bandwidth guarantee specifies the minimum bandwidth that is to be delivered to the queue unconditionally. Maximum bandwidth (shape rate) defines the maximum bandwidth the queue will receive. Excess bandwidth defines how to allocate bandwidth with siblings of the node on which it is defined. The priority attribute, described further below, defines that any offered load in this queue, up to an optionally specified rate, is to be serviced ahead of all other queues or nodes of lower priority connected to the same parent. The model allows a user to define a bandwidth associated with the priority attribute. Any traffic up to this bandwidth is regarded as priority traffic and is given priority over other queues of a lower priority. If no rate is specified, then by default the priority class can use the entire interface available bandwidth.

Minimum rate propagation is a behavior implied by some configurations of the minimum rate attribute. Minimum rate propagation allows child nodes to be configured with a minimum rate, even though the parent node does not have an equal or greater minimum rate. This means that effectively the parent node has a conditional minimum rate guarantee, in the sense that when traffic is present on the child node that has a minimum rate guarantee, the parent also has the guarantee (i.e., the guarantee has propagated from the child to the parent) to be used only for traffic coming from the child with the guarantee (i.e., the parent does not have the guarantee to be used by traffic from some other child that does not have a minimum rate guarantee.) This minimum rate propagation provides efficiency in applications (e.g., broadband aggregation) where oversubscription is common and it is not possible or desirable to give each parent node its own guarantee, yet delivery of some guaranteed service for some child node services is required, while the non-guaranteed services must be allowed to utilize available bandwidth (in a user-controlled manner) when guaranteed services are not active.

The priority attribute specifies that a class has stringent delay requirements with respect to lower priority classes, and assigning a priority attribute of the highest priority level indicates a class has the most stringent latency requirements of all classes. The priority attribute defines strict priority. This means that a queue gets to send its traffic ahead of every other sibling queue of lower priority that is connected to same parent node. An optional parameter may specify the rate that gets priority service, and beyond this rate, a policing function is invoked when there is congestion (i.e., the policer operates when congestion occurs, and is thereby a conditional policer) in order to avoid starvation of other nodes. In the absence of congestion, the priority class is allowed to exceed its configured rate. If no rate parameter is specified, the priority class can get the entire available bandwidth, and, if it is still desired to avoid starvation of other classes, priority may be used in conjunction with an unconditional policing pre-queueing operator.

The priority propagation behavior allows low latency behavior to be delivered through the hierarchy from leaf to root. Priority propagation effectively allows for priority traffic to not be bound by short-term rate constraints imposed at ancestral nodes in the queueing hierarchy. In this way, latency is optimized (i.e., reduced as much as possible) at the cost of increased burstiness in the delivery of minimum and excess rate service. Long term rate constraints generally must still be enforced, and the general model allows for the duration of disobedience to the rate to be configurable. More specifically, a burst tolerance parameter, for each layer of hierarchy through which priority behavior propagates, is associated with the stream that is enabled with priority propagation behavior. A burst tolerance parameter of 0 indicates the stream must always obey ancestral rate constraints. A burst tolerance of infinity indicates the stream need never obey the ancestral rate constraint. A burst tolerance between 0 and infinity specifies how much the stream may burst beyond the rate constraint of the ancestral node before it becomes constrained by the rate. While the priority traffic is allowed to exceed the ancestral node rates, its traffic will receive priority service (with respect to other traffic) at each layer of the hierarchy, and users can control or specify how competing such traffic streams should be serviced with respect to each other.

In addition to the priority attribute that can be assigned to queues, the following priority service order preferably applies to the schedule. Queues with the priority attribute are served before non-priority sibling queues connected to the same parent node. If there is no traffic on the queues with the priority attribute, then any queue that has a minimum bandwidth guarantee that has not yet been met is served. Finally, excess bandwidth is delivered to queues eligible for sharing in excess bandwidth. This multi-level priority service ensures a better latency for non-priority traffic with a minimum rate attribute (e.g. business traffic), as compared to traffic without a minimum rate attribute. Note that for queues with minimum bandwidth guarantee, no conditional policer is invoked once the minimum rate is delivered. Rather, traffic above the minimum guarantee competes for excess bandwidth.

The behavioral model allows for defining of multiple levels of priorities. An optional parameter defines the priority level and higher levels are given strict priority service over lower levels. For example, the priority service order may be:

Priority N
Priority N−1
. . .
Minimum bandwidth guarantees
Excess bandwidth

It should be noted that the minimum, maximum, and excess bandwidth attributes are independent of each other. For example, the share of excess bandwidth given to a queue can be defined irrespective of how much minimum bandwidth the queue is guaranteed. Hence, if it is not desired to guarantee any minimum bandwidth to best effort general Internet traffic, but it is desired to give it a larger portion of any remaining bandwidth, the attributes can be set accordingly.

As previously discussed, it is not required to explicitly configure all of the attributes for a queue. If an attribute is not explicitly configured, then a default value applies. If no minimum bandwidth guarantee is defined, then the queue is guaranteed no bandwidth. If no maximum (shape) rate is defined, the queue is allowed to take as much as it can up to the maximum available bandwidth of its parent node. The queue (or node) will still share bandwidth with its sibling queues (or nodes) as may be defined by the excess bandwidth attributes. If no excess bandwidth is defined, then the queue will share equally any excess bandwidth not consumed by queues with explicitly configured excess shares, and the sharing occurs with the queue's siblings that also have no excess explicitly defined.

As an example, traffic classes may be grouped into VLANs. In this case the excess bandwidth attribute can be used to define the sharing of excess bandwidth among the VLANs. And the maximum rate attribute can be used to define the maximum bandwidth of a VLAN. If the excess bandwidth attribute is not defined, then the VLANs will share excess bandwidth equally among them (since this is the default behavior for sharing excess bandwidth). Likewise, if no maximum rate is defined, each VLAN will try to get as much bandwidth as it can, subject to appropriate sharing with the other VLANs.

An implied class, referred to as class-default, may be defined. This class-default may not be explicitly set forth in a configuration file. For class-default no minimum bandwidth is guaranteed and no maximum rate is defined. Therefore class-default will attempt to get as much as it can, and having no excess bandwidth attribute defined, it will share bandwidth equally with other queues that have no explicitly configured excess. It should be noted, however, that any of the three bandwidth related attributes (i.e., minimum/maximum/excess) can be explicitly configured on class-default, and thereby override the default behavior.

If attributes that control queue depth are defined for a node N that is not a leaf in the hierarchy, then the queue depth value, or any similar parameter used by an AQM mechanism (e.g., the average queue depth used by RED), is computed as the sum of the depths across all child nodes of node N.

When specifying a minimum bandwidth guarantee it is preferable that the sum of all minimum rates across all queues within an interface be equal to or less than the available bandwidth. More generally, assuming a tree structure, it is required that the sum of minimum rates of a set of sibling nodes will be less or equal than to the bandwidth of the parent node. However, there are also scenarios where oversubscribing the available bandwidth is desirable.

The following example illustrates an oversubscription scenario. Assume a hierarchy where the root represents a 100 mbps Ethernet interface. Further assume VLANs as children of the root, and two child queues per VLAN, where each child queue is a leaf in the tree. Finally, assume that each VLAN has a maximum rate of 6 mbps, and one of the two children has a minimum bandwidth guarantee of 4 mbps. In this example, if oversubscription is not allowed, then the 100 mbps interface cannot support more than 25 VLANs, since the sum of minimum bandwidth guarantees across all VLANs is:

4 mbps*25<=100 mbps (i.e., the available bandwidth of the root node).

Alternatively, if oversubscription is allowed, then more than 25 VLANs can be supported. The oversubscription mode of operation allows a more aggressive deployment scenario in environments in which the traffic pattern is known to effectively not oversubscribe. Oversubscription mode can be turned off or on (and is preferably off by default). If oversubscription mode is enabled, and the offered load is such that not all oversubscribed guarantees can be met, then the defined default behavior is for oversubscribed streams to back off in proportion to the configured oversubscribed minimum rates. The general model, however, allows the user specific control over how to allocate bandwidth when the offered load presents a truly oversubscribed environment (i.e., user has complete flexibility to specify the portion of bandwidth that each node receives).

Figure 6:
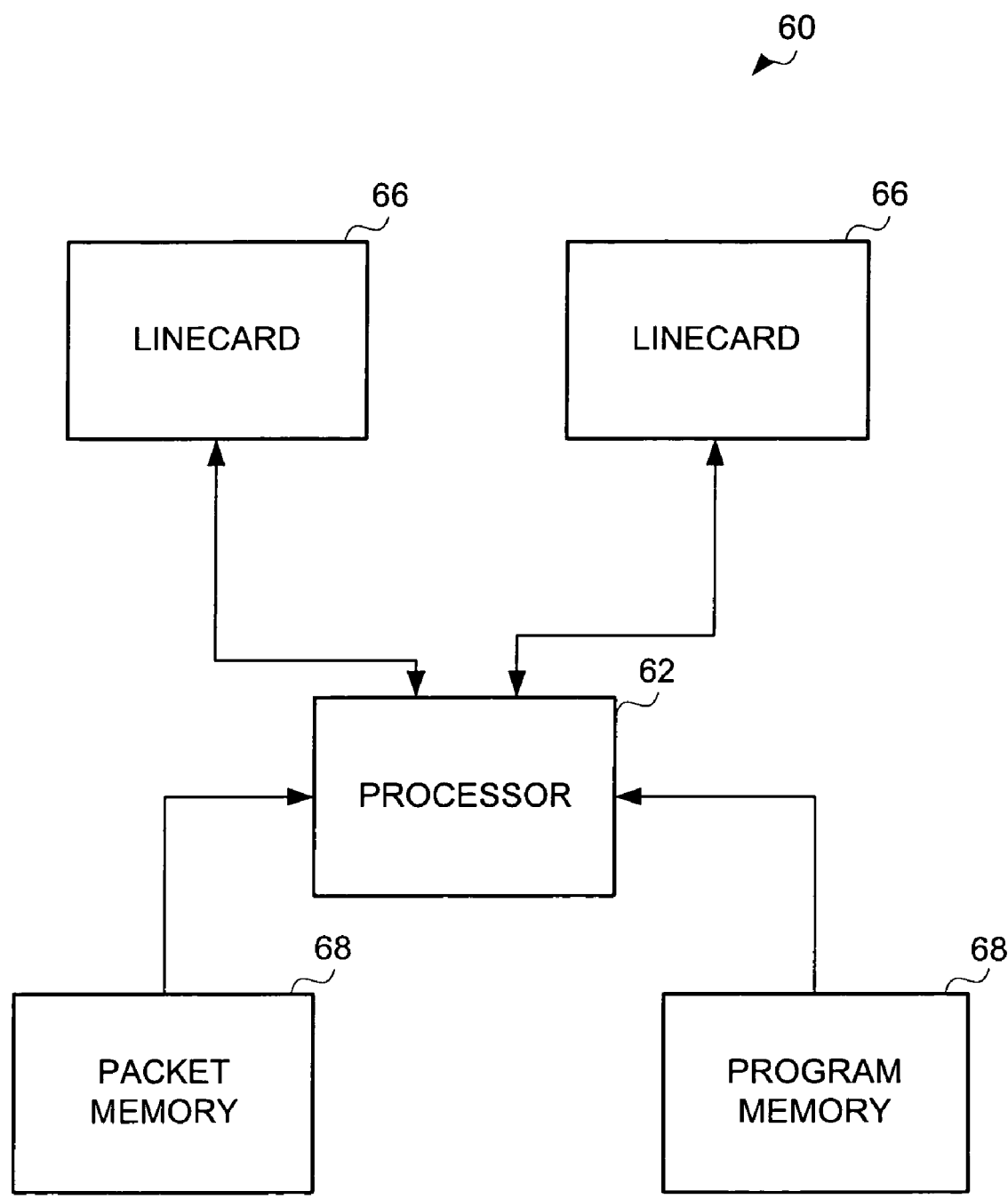
FIG. 6 is a block diagram of one example of a network device for use in implementing embodiments of the present invention.

FIG. 6 depicts a network device 60 that may be used to implement a network device that operates with the behavioral model described above. In one embodiment, network device 60 is a programmable machine that may be implemented in hardware, software, or any combination thereof. A processor 62 executes code stored in a program memory 64. Program memory 64 is one example of a computer-readable medium. Program memory 64 can be a volatile memory. Another form of computer-readable medium storing the same codes would be some type of non-volatile storage such as floppy disks, CD-ROMs, DVD-ROMs, hard disks, flash memory, etc.

Network device 60 interfaces with physical media via a plurality of linecards 66. Linecards 66 may incorporate Ethernet interfaces, DSL interfaces, Gigabit Ethernet interfaces, 10-Gigabit Ethernet interfaces, SONET interfaces, etc. As packets are received, processed, and forwarded by network device 60, they may be stored in a packet memory 68. Network device 60 implements all of the features provided by the present invention.

Packet transmission operations may occur partially or completely within one of linecards 66. To implement functionality according to the present invention, linecards 66 may incorporate processing and memory resources similar to those discussed above in connection with the network device as a whole.

Network device 60 shown in FIG. 6 is only one example of a computer system suitable for use with the invention. Other devices and systems having different configurations of subsystems may also be utilized. Communication between computers within the network is made possible with the use of communication protocols, which govern how computers exchange information over a network.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A hierarchical traffic management system comprising at least one traffic management node comprising:
    a classifier operable to identify and classify incoming traffic streams; and
    a queuing system comprising a plurality of queues and operable to apply scheduling policies to said traffic streams, said plurality of queues of the queuing system each comprising:
        enqueue attributes configured to control a depth of the queue; and
        dequeue attributes configured to control scheduling of the queue, said dequeue attributes comprising minimum bandwidth, maximum bandwidth, excess bandwidth, and priority, wherein each of said plurality of queues has one or more of said dequeue attributes defined;

wherein said plurality of queues define a queue hierarchy, each layer of said queue hierarchy configured to support one or more priority queues and comprising one or more of said queues configured for said minimum bandwidth attribute and one or more of said queues configured for said excess bandwidth attribute;

wherein a first of said plurality of queues comprises a propagated attribute that propagates through said hierarchy from said first queue to a root queue, wherein said propagated attribute applies to said first queue and parent queues of said first queue with respect to traffic associated with said first queue, said priority propagated attribute comprising a priority propagation attribute which specifies whether or not priority service at a queue is propagated through a hierarchy of the queue; and wherein a burst tolerance parameter is associated with a stream enabled with priority propagation, the burst tolerance parameter provided for each layer of hierarchy through which priority behavior propagates.

2. The system of claim 1 wherein the packet scheduling system comprises at least three layers of hierarchy.

3. The system of claim 1 wherein at least a portion of said plurality of queues have said minimum bandwidth attribute defined.

4. The system of claim 3 wherein at least a portion of said plurality of queues have said excess bandwidth attribute defined.

5. The system of claim 1 wherein at least a portion of said plurality of queues have said maximum bandwidth attribute defined.

6. The system of claim 1 wherein the attributes not defined at each of said plurality of queues have a default value.

7. The system of claim 1 wherein each of said dequeue attributes are defined for one or more of said plurality of queues.

8. The system of claim 1 wherein each of said plurality of queues set as a priority queue sends traffic ahead of other queues sharing a parent node.

9. The system of claim 1 wherein each of said plurality of queues having a defined priority attribute have defined a level of priority.

10. The system of claim 1 wherein at least some of said queues are configured as conditional or unconditional policers, wherein said conditional policer performs policing conditioned on a congested state of the system and allows said queue to exceed its configured rate if bandwidth is available, and said unconditional policer limits the rate of said queue regardless of the state of the system.

11. The system of claim 1 wherein each of said plurality of queues is configured to allow for an oversubscription mode in which minimum rates are oversubscribed, wherein allocation of bandwidth to said plurality of queues is user defined.

12. The system of claim 1 wherein the traffic management node further comprises a pre-queuing operator configured to operate on at least some of said incoming traffic streams before the streams enter the queuing system.

13. The system of claim 1 wherein the traffic management node further comprises a post-queuing operator configured to operate on at least some of said incoming traffic streams after the streams pass through the queuing system.

14. The system of claim 13 wherein the post-queuing operator is configured to compress packets.

15. The system of claim 1 wherein said propagated attribute comprises a minimum-rate propagation attribute.

16. The system of claim 1 wherein said propagated attribute comprises a priority propagation attribute.

17. The system of claim 1 wherein the hierarchical traffic management system is located within a network device comprising two or more of the traffic management nodes.

18. The system of claim 1 further comprising a user interface configured for use with a platform independent common configuration language.

19. The system of claim 1 wherein the depth of a queue is controlled by a specified maximum queue depth.

20. The system of claim 1 wherein the depth of a queue is controlled by specification of a Random Early Detection profile.

21. A method for hierarchical traffic management at a network device having a queuing system comprising a plurality of layers of hierarchy, each layer of the hierarchy configured for supporting one or more priority nodes and associated with a class, logical interface, or physical interface, one or more nodes having a guaranteed minimum rate, one or more nodes designated for receiving excess bandwidth, and one or more nodes having a defined maximum rate, the method comprising:

classifying incoming traffic streams; and applying scheduling policies to said traffic streams at one or more queues, said scheduling policies comprising minimum bandwidth, maximum bandwidth, excess bandwidth, and priority, wherein traffic up to a specified bandwidth is defined as priority traffic;

wherein each of said layers is configured to support one or more priority queues and comprises one or more of said queues configured for said minimum bandwidth scheduling policy and one or more of said queues configured for said excess bandwidth scheduling policy;

wherein a first of said plurality of queues comprises a propagated attribute that propagates through said hierarchy from said first queue to a root queue, wherein said propagated attribute applies to said first queue and parent queues of said first queue with respect to traffic associated with said first queue, said priority propagated attribute comprising a priority propagation attribute which specifies whether or not priority service at a queue is propagated through a hierarchy of the queue; and wherein a burst tolerance parameter is associated with a stream enabled with priority propagation, the burst tolerance parameter provided for each layer of hierarchy through which priority behavior propagates.

22. The method of claim 21 wherein said one or more of the scheduling policies at said one or more of the queues have default values applied.

23. The method of claim 21 wherein the burst tolerance parameter indicates how much the stream is permitted to burst beyond a rate constraint of an ancestral node before the stream becomes constrained by the rate.

24. The method of claim 21 wherein said propagated attribute comprises a minimum rate propagation attribute which specifies whether or not a minimum rate at a queue is propagated through a hierarchy of the queue.

25. The method of claim 21 further comprising enabling an oversubscription mode in which oversubscribed streams are reduced in proportion to a specified oversubscription minimum rate.

26. A computer-readable medium storing computer-executable instructions for hierarchical traffic management at a network device having a queuing system comprising a plurality of layers of hierarchy, each layer of the hierarchy configured for supporting one or more priority nodes and associated with a class, logical interface, or physical interface, one or more nodes having a guaranteed minimum rate, one or more nodes designated for receiving excess bandwidth, and one or more nodes having a defined maximum rate, the instructions comprising:

code that classifies incoming traffic streams; and code that applies scheduling policies to said traffic streams at one or more queues, said scheduling policies comprising minimum bandwidth, maximum bandwidth, excess bandwidth, and priority, wherein traffic up to a specified bandwidth is defined as priority traffic;

wherein said plurality of queues define a queue hierarchy, each layer of said queue hierarchy configured to support one or more priority queues and comprising one or more of said queues configured for said minimum bandwidth attribute and one or more of said queues configured for said excess bandwidth attribute;

wherein a first of said plurality of queues comprises a propagated attribute that propagates through said hierarchy from said first queue to a root queue, wherein said propagated attribute applies to said first queue and parent queues of said first queue with respect to traffic associated with said first queue, said priority propagated attribute comprising a priority propagation attribute which specifies whether or not priority service at a queue is propagated through a hierarchy of the queue; and wherein a burst tolerance parameter is associated with a stream enabled with priority propagation, the burst tolerance parameter indicating how much the stream is permitted to burst beyond a rate constraint of an ancestral node before the stream becomes constrained by the rate.

27. A system for hierarchical traffic management at a network device having a queuing system comprising a plurality of layers of hierarchy, each layer of the hierarchy configured for supporting one or more priority nodes and associated with a class, logical interface, or physical interface, one or more nodes having a guaranteed minimum rate, one or more nodes designated for receiving excess bandwidth, and one or more nodes having a defined maximum rate, the method comprising:

means for classifying incoming traffic streams; and means for applying scheduling policies to said traffic streams at one or more queues, said scheduling policies comprising minimum bandwidth, maximum bandwidth, excess bandwidth, and priority, wherein traffic up to a specified bandwidth is defined as priority traffic;

wherein said plurality of queues define a queue hierarchy, each layer of said queue hierarchy configured to support one or more priority queues and comprises one or more of said queues configured for said minimum bandwidth attribute and one or more of said queues configured for said excess bandwidth attribute;

wherein a first of said plurality of queues comprises a propagated attribute that propagates through said hierarchy from said first queue to a root queue, wherein said propagated attribute applies to said first queue and parent queues of said first queue with respect to traffic associated with said first queue, said priority propagated attribute comprising a priority propagation attribute which specifies whether or not priority service at a queue is propagated through a hierarchy of the queue; and wherein a burst tolerance parameter is associated with a stream enabled with priority propagation, the burst tolerance parameter indicating how much the stream is permitted to burst beyond a rate constraint of an ancestral node before the stream becomes constrained by the rate.

* * * * *